US007733838B2

(12) United States Patent
Kwon et al.

(10) Patent No.: US 7,733,838 B2
(45) Date of Patent: Jun. 8, 2010

(54) DEVICES AND METHODS OF TRANSMITTING DATA, SOURCE DRIVERS USING THE SAME, AND LIQUID CRYSTAL DISPLAY (LCD) DEVICES HAVING THE SAME

(75) Inventors: Jae-Wook Kwon, Yongin-si (KR); Sung-Pil Choi, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 388 days.

(21) Appl. No.: 11/743,417

(22) Filed: May 2, 2007

(65) Prior Publication Data

US 2008/0043701 A1 Feb. 21, 2008

(30) Foreign Application Priority Data

May 12, 2006 (KR) ...................... 10-2006-0042772

(51) Int. Cl.
*H04B 7/216* (2006.01)

(52) U.S. Cl. ....................................... 370/342; 345/211

(58) Field of Classification Search ................. 345/100, 345/98, 211, 204, 619, 88, 214; 348/222, 348/294

See application file for complete search history.

(56) References Cited

U.S. PATENT DOCUMENTS

| | | | | |
|---|---|---|---|---|
| 6,760,035 | B2 * | 7/2004 | Tjandrasuwita | 345/545 |
| 6,839,046 | B1 * | 1/2005 | Orisaka et al. | 345/98 |
| 7,088,350 | B2 * | 8/2006 | Miyazawa | 345/204 |
| 7,116,358 | B1 * | 10/2006 | Sasaki | 348/222.1 |
| 7,403,198 | B2 * | 7/2008 | Lin | 345/211 |
| 7,518,588 | B2 * | 4/2009 | Lin | 345/98 |
| 2002/0080107 | A1 * | 6/2002 | Fujimoto et al. | 345/87 |
| 2004/0239685 | A1 * | 12/2004 | Kiyokawa et al. | 345/619 |
| 2004/0252112 | A1 * | 12/2004 | Fukuda et al. | 345/204 |
| 2004/0257328 | A1 * | 12/2004 | Lim | 345/100 |

(Continued)

FOREIGN PATENT DOCUMENTS

JP 2003-233358 8/2003

(Continued)

OTHER PUBLICATIONS

English Abstract for Publication No. 2003-233358.

(Continued)

*Primary Examiner*—Thong H Vu
(74) *Attorney, Agent, or Firm*—F. Chau & Associates, LLC

(57) ABSTRACT

A data transmission device for reducing power consumption includes a data source configured to provide data, a data transmission line having a plurality of data transmission sections, and data storage units respectively coupled to the data transmission sections. The respective data storage units determine whether the data storage units store the provided data, and store the provided data based on the determination result. The provided data is sequentially stored into the data storage units, from one end of the data storage units to the other end of the data storage units. A data transmission controller is configured to control the data transmission sections and to transmit the provided data to one of the data storage units. Therefore, the data transmission device may reduce electromagnetic interference (EMI) that is proportional to the current in the source driver.

26 Claims, 6 Drawing Sheets

U.S. PATENT DOCUMENTS

| | | | | |
|---|---|---|---|---|
| 2005/0168602 | A1* | 8/2005 | Sumi et al. | 348/294 |
| 2005/0226500 | A1* | 10/2005 | Sasaki et al. | 382/166 |
| 2005/0253824 | A1* | 11/2005 | Lin | 345/204 |
| 2006/0007094 | A1* | 1/2006 | Kang et al. | 345/98 |
| 2006/0114205 | A1* | 6/2006 | Shen et al. | 345/88 |
| 2006/0244709 | A1* | 11/2006 | Lin | 345/100 |
| 2007/0182690 | A1* | 8/2007 | Lin | 345/100 |
| 2007/0262941 | A1* | 11/2007 | Jan et al. | 345/96 |
| 2008/0246755 | A1* | 10/2008 | Lee | 345/214 |

FOREIGN PATENT DOCUMENTS

| | | |
|---|---|---|
| KR | 1020030086047 | 11/2003 |
| KR | 1020050009779 | 1/2005 |

OTHER PUBLICATIONS

English Abstract for Publication No. 1020030086047.
English Abstract for Publication No. 1020050009779.

* cited by examiner

500

DEVICES AND METHODS OF TRANSMITTING DATA, SOURCE DRIVERS USING THE SAME, AND LIQUID CRYSTAL DISPLAY (LCD) DEVICES HAVING THE SAME

CROSS-REFERENCE TO RELATED APPLICATIONS

This application claims priority under 35 USC §119 to Korean Patent Application No. 10-2006-0042772, filed on May 12, 2006 in the Korean Intellectual Property Office (KIPO), the entire contents of which are herein incorporated by reference.

BACKGROUND OF THE INVENTION

1. Technical Field

The present disclosure relates to transmitting data, and more particularly to devices and methods of transmitting data, source drivers using methods for transmitting data, and liquid crystal display (LCD) devices having devices for transmitting data.

2. Discussion of the Related Art

A liquid crystal display (LCD) device is a flat display device that uses liquid crystal to display images. Sizes of LCD devices are gradually increasing according to user demand. As the display sizes are increased, the numbers of pixels representing the images are increased and power consumption of the LCD devices is increased.

LCD devices generate electromagnetic noise as an unintended consequence of consuming power, and the electromagnetic noise is emitted as a form of electromagnetic radiation. The electromagnetic noise is often called electromagnetic interference (EMI).

FIG. 1 illustrates an environment for measuring electromagnetic interference (EMI) of an LCD device, and FIG. 2 is a graph illustrating international standards related to EMI.

As illustrated in FIG. 1, a method of measuring the EMI includes displaying H patterns on a panel of the LCD device and measuring the EMI level at a distance of about 3 or 10 meters from the LCD device using an antenna.

As illustrated in FIG. 2, the EMI level according to the CISPR 22 standard of the International Special Committee on Radio Interference is measured at a distance of about 3 meters from the LCD device. In a frequency bandwidth from 30 MHz to 238 MHz, the EMI level of the LCD device should not exceed 40 dB, and in a frequency bandwidth from 238 MHz to 1,000 MHz, the EMI level of the LCD device should not exceed 49.8 dB.

Also, as illustrated in FIG. 2, the EMI level according to the CISPR 22-B standard is measured at a distance of about 10 meters from the LCD device. In a frequency bandwidth from 30 MHz to 238 MHz, the EMI level of the LCD device should not exceed 30 dB, and in a frequency bandwidth from 238 MHz to 1,000 MHz, the EMI level of the LCD device should not exceed 37 dB.

The EMI level of the LCD device is important because the LCD device is considered to be defective if the EMI level of the LCD device does not satisfy the CISPR 22 and CISPR 22-B standards.

Generally, EMI is represented as an electric field intensity E that is calculated by Equation 1.

$$E = \frac{kIlf}{r}(uVm^{-1}), \qquad \text{[Equation 1]}$$

where k indicates a constant, I indicates a current, l indicates a conducting wire length, f indicates a frequency and r indicates a distance.

Referring to Equation 1, the electric field intensity E is proportional to the current I, the conducting wire length l and the frequency f, and is inversely proportional to the distance r. The LCD device has a relatively high power consumption since a large amount of data is transmitted, line by line, over a relatively short time period. Therefore, a method of reducing the EMI level includes reducing the current I and the conducting wire length l.

SUMMARY OF THE INVENTION

Exemplary embodiments of the present invention provide devices and methods of transmitting data capable of reducing an amount of current consumed.

Exemplary embodiments of the present invention provide source drivers and methods of driving a source driver capable of reducing an amount of current consumed.

Exemplary embodiments of the present invention provide liquid crystal display (LCD) devices capable of reducing an amount of current consumed.

In some exemplary embodiments of the present invention, a data transmission device includes a data source configured to provide data, a data, transmission line having a plurality of data transmission sections, and data storage units respectively coupled to the data transmission sections. The respective data storage units determine whether the data storage units store the provided data and store the provided data based on the determination result. The provided data is sequentially stored into the data storage unit, from one end of the data storage units to the other end of the data storage units. A data transmission controller is configured to control the data transmission sections and the provided data is transmitted to one of the data storage units.

The data transmission device may further include a switching unit configured to turn on or off the data transmission lines. The data transmission controller controls the switching unit so as to store the provided data into one of the data storage units.

The data transmission controller may control the switching unit to transmit the provided data to a first data transmission section between the data source and one of the data storage units. A second data transmission section corresponds to a data transmission section other than the first data transmission section.

The data transmission device may further include a clock provider configured to provide a clock signal to the data storage units. The data storage units respectively determine whether the data storage units store the provided data based on the provided clock signal.

The data storage units may respectively perform a counting operation on the provided clock signal and respectively determine, based on the counted clocks, whether the data storage units store the provided data.

In exemplary embodiments of the present invention, a source driver in an LCD device includes a data register configured to provide data, a data transmission line having a plurality of data transmission sections, and data latch units configured to store the provided data. The data latch units are respectively coupled to the data transmission sections. A shift register unit is configured to transmit a control signal to the data latch units, respectively, and the provided data is sequentially stored into the data latch units, from one end of the data latch units through to the other end of the data latch units. The control signal indicates whether the data, latch units respectively store the provided data. A data transmission controller is configured to control the data transmission sections and the provided data is transmitted to one of the data latch units.

The shift register unit may receive a clock signal from an external source, perform a shift operation on the received clock signal, and generate the control signal based on the shifted clock signal.

The source driver may further include a clock provider configured to provide the clock signal to the shift register. Also, the source driver may further include a switching unit configured to turn on or off the data transmission lines. The data transmission controller controls the switching unit, to store the provided data into one of the data latch units.

The data transmission controller may control the switching unit to transmit the provided data to a first data transmission section between the data source and one of the data latch units. The data transmission controller need not transmit the provided data to a second data transmission section. The second data transmission section corresponds to a data transmission section other than the first data transmission section.

The data transmission controller may perform a counting operation on the provided clock signal and determine the first data transmission section based on the counted clocks.

The number of the data latch units may correspond to a value of N, the data latch units may respectively include M data latch circuits, and the data transmission controller may determine the first data transmission section based on a control value. The control value may be obtained by firstly dividing the number of the counted clocks into a value of M×N, and secondly, dividing the divided number of the counted shift clocks into a value of M.

In exemplary embodiments of the present invention, an LCD device includes a display panel configured to include a plurality of gate lines and a plurality of data lines, a gate driver configured to drive the gate lines in the display panel, and a source driver configured to drive the data lines in the display panel. The source driver includes a data register configured to provide data, a data transmission line having a plurality of data transmission sections, and data latch units configured to store the provided data. The data latch units are respectively coupled to the data transmission sections. A shift register unit is configured to transmit a control signal to the data latch units, respectively. The provided data is sequentially stored into the data latch units, from one end of the data latch units to the other end of the data latch units. The control signal indicates whether the data latch units respectively store the provided data. A data transmission controller is configured to control the data transmission sections to transmit the provided data to one of the data latch units.

The shift register unit may receive a clock signal from an external source, perform a shift operation on the received clock signal, and generate the control signal based on the shifted clock signal.

The LCD device may further include a clock provider configured to provide the clock signal to the shift register. Also, the LCD device may further include a switching unit configured to turn on or off the data transmission lines. The data transmission controller controls the switching unit to store the provided data into one of the data latch units.

The data transmission controller may control the switching unit to transmit the provided data to a first data transmission section between the data source and the one of the data latch units. The data transmission controller need not transmit the provided data to a second data transmission section. The second data transmission section corresponds to a data transmission section other than the first data transmission section.

The data transmission controller may perform a counting operation on the provided clock signal and determine the first data transmission section based on the counted clocks.

The number of the data latch units may correspond to a value of N, the data latch units may respectively include M data latch circuits, and the data transmission controller may determine the first data transmission section based on a control value. The control value may be obtained by firstly dividing the number of the counted clocks into a value of M×N, and secondly dividing the divided number of the counted shift clocks into a value of M.

In exemplary embodiments of the present invention, a method of transmitting data includes receiving data from a data source. The data is transmitted, to data storage units respectively coupled to a data transmission line, the outputted data through the data transmission line including a plurality of data transmission sections. It is determined whether the data storage units respectively store the outputted data so as to sequentially store the outputted data into the data storage units, from one end of the data storage units to the other end of the data storage units. The data transmission sections are controlled to transmit the outputted data to one of the data storage units.

The determining may include performing a shift operation on a clock signal received from an external source and determining, based on the shifted clock signal, whether the data storage units store the outputted data.

The controlling may include controlling a switch unit configured to turn on or off the data transmission sections.

In exemplary embodiments of the present invention, a method of driving a source driver in an LCD device includes outputting data from a data register. The data is transmitted to data latch units respectively coupled to a data transmission line. The data outputted through the data transmission line includes a plurality of data transmission sections. It is determined whether the data latch units respectively store the outputted data to sequentially store, into the data latch units, from one end of the data latch units to the other end of the data latch units, the outputted data. The data transmission sections are controlled to transmit the outputted data to one of the data latch units.

The determining may include performing a shift operation on a clock signal received from an external source and determining, based on the shifted clock signal, whether the data latch units store the outputted data.

The controlling may include controlling a switch unit configured to turn on or off the data transmission sections.

Controlling the switch unit may include performing a count operation on the received clock signal and determining, based on the counted clocks, a data transmission section between the data register and the one of the data latch units.

BRIEF DESCRIPTION OF THE DRAWINGS

Exemplary embodiments of the present invention will become more apparent by describing in detail exemplary embodiments of the present invention with reference to the accompanying drawings, wherein.

DETAILED DESCRIPTION OF THE EXEMPLARY EMBODIMENTS

Detailed illustrative exemplary embodiments of the present invention are disclosed herein. This invention may, however, be embodied in many alternate forms and should not he construed as limited to exemplary embodiments of the present invention set forth herein.

It will be understood that when an element is referred to as being "connected" or "coupled" to another element, it can be directly connected or coupled to the other element or intervening elements may be present.

Exemplary embodiments of the present invention will now be described more fully with reference to the accompanying figures, in which exemplary embodiments of the present invention are shown.

Figure 1:
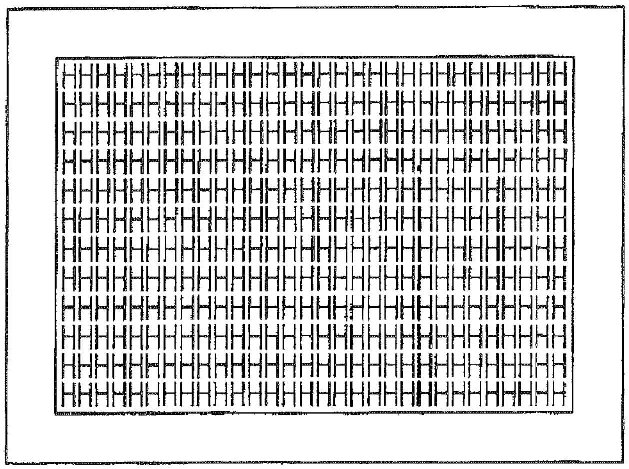
FIG.1 (CONVENTIONAL ART)
FIG. 1 illustrates an environment for measuring electromagnetic interference (EMI) of a liquid crystal display (LCD) device.
Figure 2:
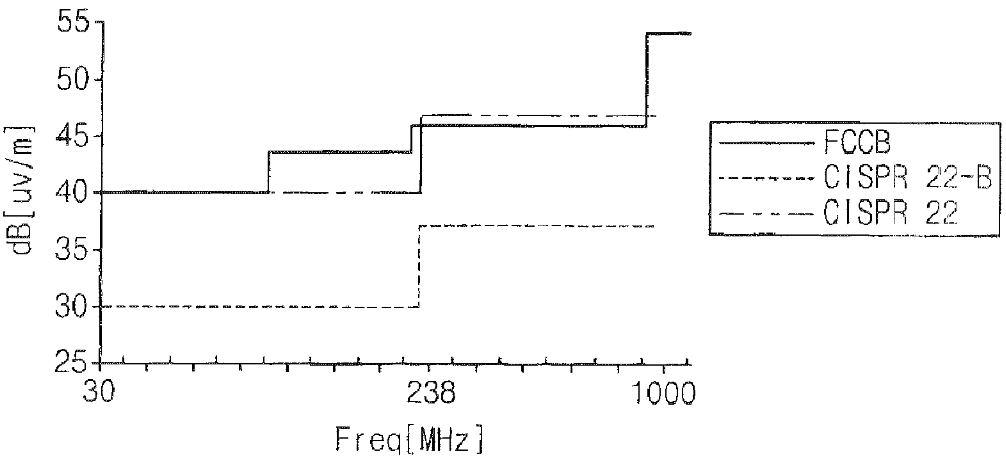
FIG.2 (CONVENTIONAL ART)
FIG. 2 is a graph illustrating international standards related to EMI.
Figure 3:
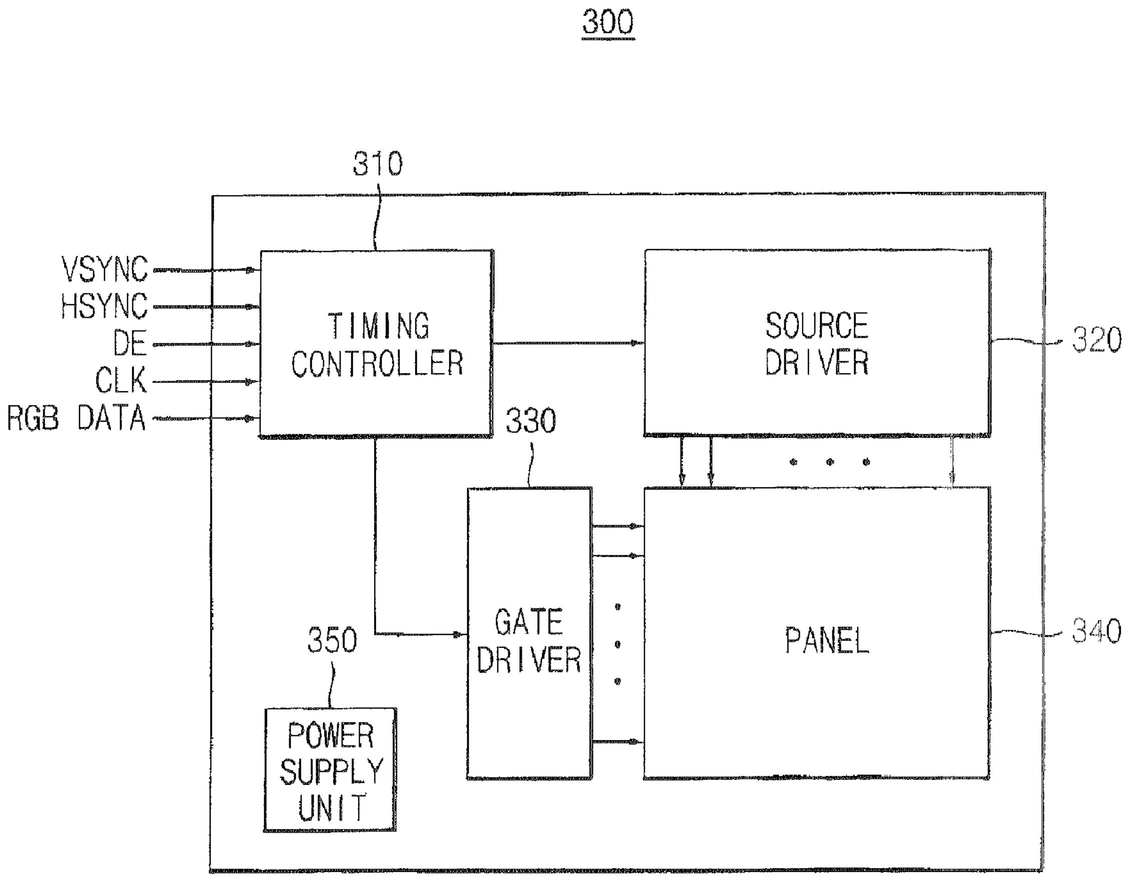
FIG. 3 is a block diagram illustrating an LCD device according to an exemplary embodiment of the present invention.

FIG. 3 is a block diagram illustrating a liquid crystal display (LCD) device according to an exemplary embodiment of the present invention.

Referring to FIG. 3, an LCD device 300 includes a timing controller 310, a source driver 320, a gate driver 330, a panel 340 and a power supplying unit 350.

The timing controller 310 receives, from a graphic controller (not shown), a vertical synchronization signal VSYNC, a horizontal synchronization signal HSYNC, a data enable signal DE, a clock signal CLK and a red-green-blue (RGB) signal, and transmits the RGB signal, a source driver control signal and a gate driver signal to the source driver 320 and the gate driver 330.

The source driver 320 receives the RGB signal and the source driver control signal outputted from the timing controller 310, and outputs, in response to the horizontal synchronization signal HSYNC, the RGB signal by line.

The gate driver 330 includes a plurality of gate lines and receives the gate driver control signal outputted from the timing controller 310. The gate driver 330 controls the gate lines to sequentially output, to the panel 340, the data outputted from the source driver 320.

The power supplying unit 350 provides power to the timing controller 310, the source driver 320, the gate driver 330 and the panel 340.

The operation of the LCD device in FIG. 3 is described below.

The timing controller 310 receives, from the graphic controller (not shown), the RGB signal representing an image, the vertical synchronization signal VSYNC and the horizontal synchronization signal HSYNC.

The gate driver 330 receives a gate line control signal, for example, the vertical synchronization signal VSYNC, and performs a shift operation on the vertical synchronization signal VSYNC to control the gate lines based on the shifted vertical synchronization signal VSYNC.

The source driver 320 receives the RGB signal and the source driver control signal from the timing controller 310, and outputs a single line of the image when the gate driver 330 controls the gate lines based on the shifted vertical synchronization signal VSYNC.

Figure 4:
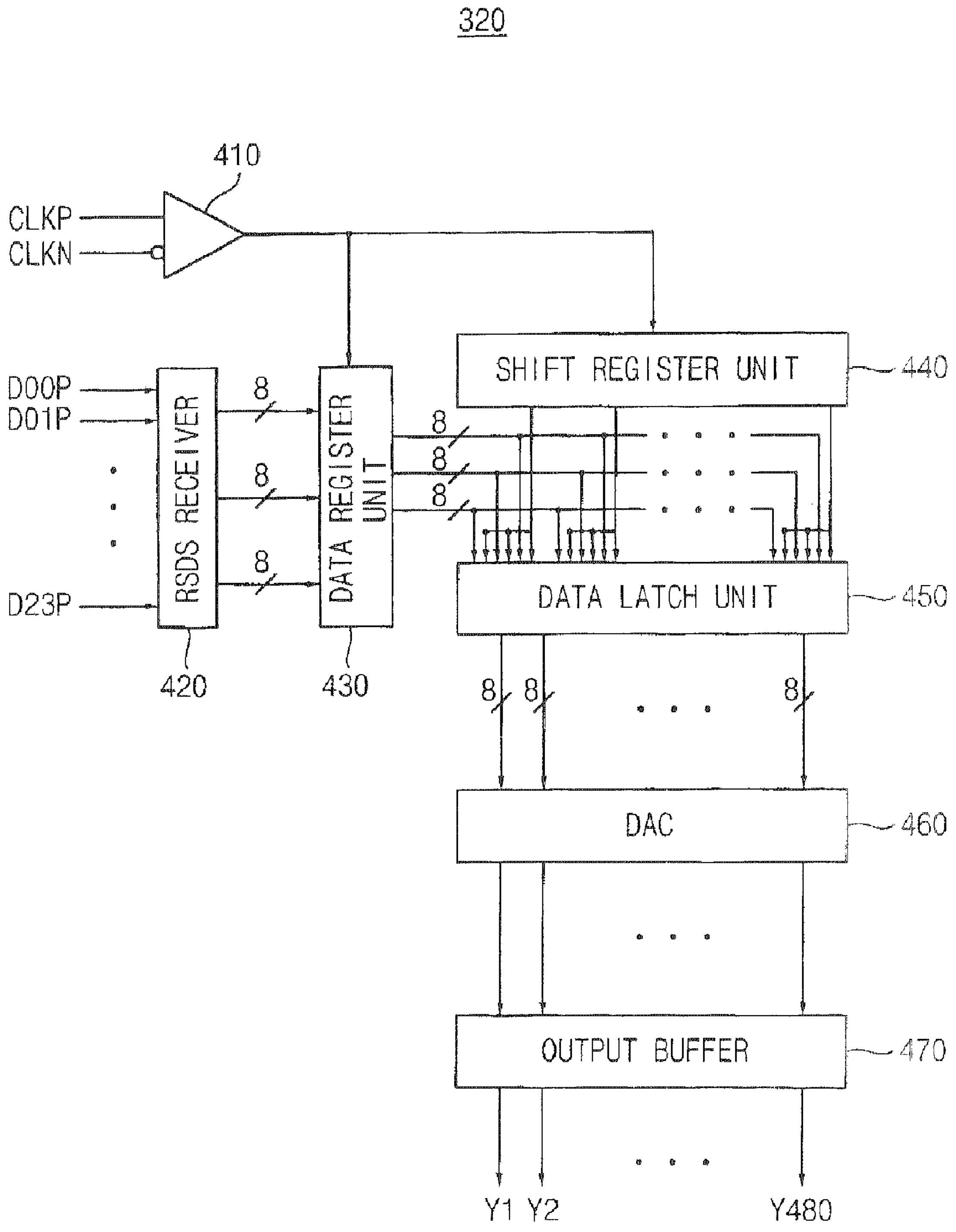
FIG. 4 is a block diagram illustrating a source driver in FIG. 3 according to an exemplary embodiment of the present invention.

FIG. 4 is a block diagram illustrating the source driver 320 of FIG. 3 according to an exemplary embodiment of the present invention.

Referring to FIG. 4, the source driver 320 includes a clock providing unit 410, a reduced swing differential signal (RSDS) input unit 420, a data register unit 430, a shift register unit 440, a data latch unit 450, a digital-analog converter (DAC) 460 and an output buffer 470.

The clock providing unit 410 receives a clock signal from an external source and provides the received clock signal to the data register unit 430 and the shift register unit 440. The received clock signal may be used to synchronize an output of the data register unit 430 and an output of the shift register unit 440.

The RSDS input unit 420 receives an RSDS from the timing controller 310 and outputs the RGB signal to the data register unit 430. For example, the RGB signal may be configured with 24 bits representing 8-bit red data, 8-bit green data and 8bit blue data, respectively.

The data register unit 430 outputs, to the data latch unit 450, the RGB signal based on the clock signal outputted from the clock providing unit 410. For example, the data register unit 430 may include registers respectively storing the 8-bit red data, the 8-bit green data and the 8-bit blue data. Also, the data register unit 430 operates at substantially the same speed as the clock of the RSDS input unit 420 to output 8-bit data, or operates at half the speed of the RSDS input unit 420 to output 16-bit data, The shift register unit 440 receives the clock signal from the clock providing unit 410 and performs a shift operation on the received clock signal. The shift register unit 440 sequentially outputs the shifted clock signal to the data latch 450.

The data latch unit 450 includes a plurality of latch circuits, and receives the shifted clock signal outputted from the shift register unit 440 and the RGB signal outputted from the data register unit 430. The data latch unit 450 sequentially stores the RGB signal based on the shifted clock signal. The RGB signal is sequentially stored into the latch circuits, from one end of the latch circuits to another end of the latch circuits.

The DAC 460 receives, from the data latch unit 450, digital data corresponding to a single line of the image and converts the digital data into analog data.

The output buffer 470 outputs the analog data, which is converted by the DAC 460, to the panel 450 in response to the source driver control signal.

Operations of the data register unit 430, the shift register unit 440 and the data latch unit 450 in the source driver 320 are described below.

The data register unit 430 and the shift register unit 440 receive the clock signal outputted from the clock providing unit 410. The data register unit 430 outputs, to the data latch unit 450, the RGB signal based on the received clock signal. The shift register unit 440 performs a shift operation on the received clock signal and outputs, to the data latch 450, a latch control signal based on the shifted clock signal.

The data latch unit 450 sequentially stores, into the latch circuits, from one end of the latch circuits to the other end of the latch circuits included in the data latch unit 450, the RGB signal based on the shifted clock signal.

For example, the shift register unit 440 includes a plurality of shift registers and the shift registers may correspond, one-to-one, to the latch circuits to store the RGB signal into the latch circuits, from one end of the latch circuits to the other end of the latch circuits.

Figure 5:
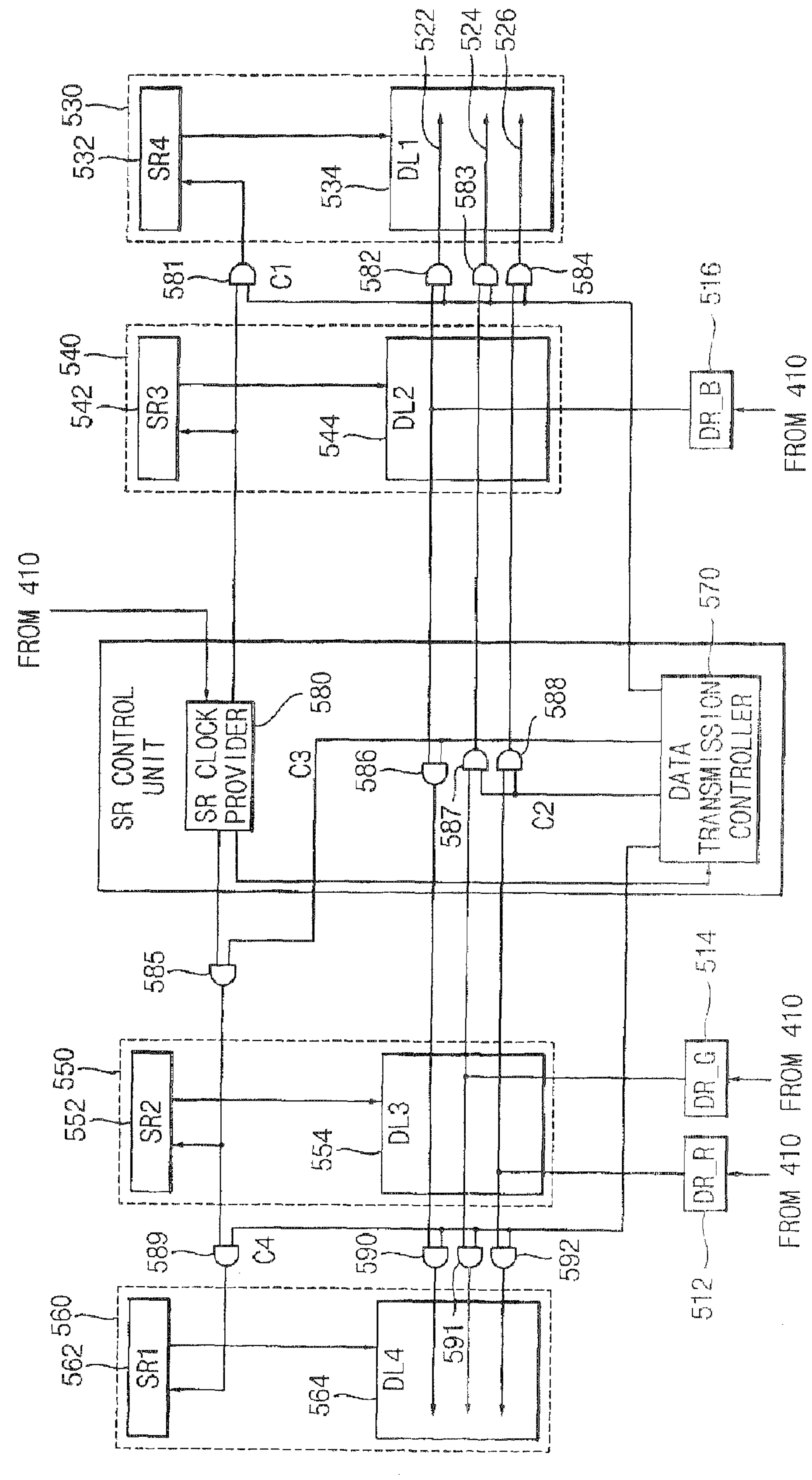
FIG. 5 is a circuit diagram illustrating a part of a source driver according to an exemplary embodiment of the present invention.

FIG. 5 is a circuit diagram illustrating a part of a source driver according to an example embodiment of the present invention.

Referring to FIG. 5, a source driver 500 includes data registers 512, 514 and 516, data transmission lines 522, 524 and 526, data storage units 530, 540, 550 and 560, data transmission controller 570, shift register clock providing unit 580 and switches 581, 582, 583, 584, 585, 586, 587, 588, 589, 590, 591 and 592.

The data registers 512, 514 and 516 respectively receive the RGB signal and the clock signal from the RSDS input, unit 420 and the clock providing unit 410, and outputs, to the data transmission lines 522, 524 and 526, the RGB signal in response to the clock signal.

The data transmission lines 522, 524 and 526 include a plurality of data transmission sections. For example, the data transmission sections may be controlled by the switches 581, 582, 583, 584, 585, 586, 587, 588, 589, 590, 591 and 592.

The data storage units 530, 540, 550 and 560 respectively include shift register units 532, 542, 552 and 562 and the data latch units 534, 544, 554 and 564. The data storage units 530, 540, 550 and 560 determine whether the data storage units 530, 540, 550 and 560 store the outputted RGB signal, so as to sequentially store the outputted RGB signal, into the data storage units, from one end of the data storage units to the other end of the data storage units (e.g., the data storage units 530, 540, 550 and 560).

The shift register units 532, 542, 552 and 562 receive the clock signal from the shift register clock providing unit 580 and perform a shift operation on a shift clock signal outputted from the shift register clock providing unit 580 to determine whether the data storage units 530, 540, 550 and 560 respectively store the RGB signal. The outputted RGB signal is sequentially stored into the data storage units, from one end of the data storage units to the other end of the data storage units (e.g., the data storage units 530, 540, 550 and 560).

The data latch units 534, 544, 554 and 564 receive the shifted clock signal and sequentially store the RGB signal in response to the shifted clock signal (e.g. from the data latch unit 534 to the data latch unit 564).

The shift register clock providing unit 580 provides, to the shift registers 532, 542, 552 and 562 and the data transmission controller 570, the shift clock signal based on the clock signal outputted from the clock providing unit 410.

The data transmission controller 570 controls the data transmission sections based on the shift clock signal outputted from the shift register clock providing unit 580, in which the data transmission sections is included in the data transmission lines 522, 524 and 526. For example, the data transmission controller 570 inputs the switch control signals C1, C2, C3 and C4, to the switches 581, 582, 583, 584, 585, 586, 587, 588, 589, 590, 591 and 592, and the switches 581, 582, 583, 584, 585, 586, 587, 588, 589, 590, 591 and 592 are turned on and/or off based on the switch control signals. The data transmission controller 570 controls the data transmission sections by turning on and/or off the switches 581, 582, 583, 584, 585, 586, 587, 588, 589, 590, 591 and 592.

For example, if the data transmission lines 522, 524 and 526 are configured with 8 bits and a load capacitance of the respective data transmission lines 522, 524 and 526 corresponds to 2.8 pF, then the total capacitance of the data transmission lines 522, 524 and 526 corresponds to 67.2 pF. However, if the data transmission controller 570 controls the data transmission lines, the total capacitance corresponds to 33.6 pF in the worst case. Therefore, switching noise may be reduced when the switching noise occurs in a case where voltages of the data transmission lines 522, 524 and 526 are toggled from high voltages to low voltages or from low voltages to high voltages.

Figure 6:
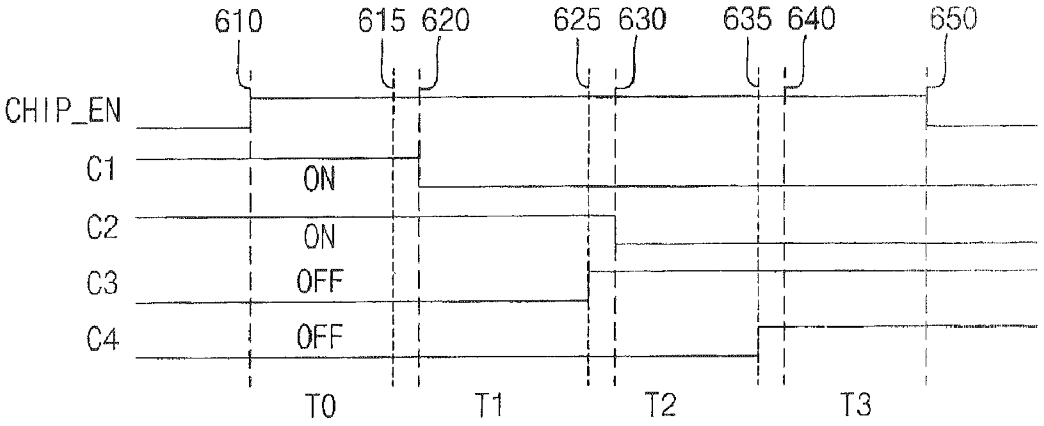
FIG. 6 is a timing diagram illustrating an operation of a data transmission controller in FIG. 5.

FIG. 6 is a timing diagram illustrating an operation of a data transmission controller in FIG. 5.

Referring to FIG. 6, the operation of the data transmission controller 570 includes four steps T0 through T3.

The operation of the data transmission controller 570 is described below with reference to FIG. 5 and FIG. 6.

In the first step T0 (610 through 620), the data transmission controller 570 changes levels of the first and second control signals C1 and C2 into a logic high (e.g., bit '1') and changes levels of the third and fourth control signals C3 and C4 into a logic low (e.g., bit '0') to torn on the switches 581, 582, 583, 584, 587 and 588.

The data transmission controller 570 controls the data transmission sections such that the data transmission controller 570 outputs, to the first data storage unit 530, the RGB signal outputted from the data register units 512, 514 and 516. The RGB signal outputted from the data register units 512, 514 and 516 need not be outputted to the third and fourth data storage units 550 and 560.

In the second step T1 (620 through 630), the data transmission controller 570 changes a level of the second control signal C2 into a logic high (e.g., bit '1') and changes levels of the first, third and fourth control signals C1, C3 and C4 into a logic low (e.g., bit '0') to turn on the switches 587 and 588.

The data transmission controller 570 controls the data transmission sections such that the data transmission controller 570 outputs, to the second data storage unit 540, the RGB signal outputted from the data register units 512, 514 and 516. The RGB signal outputted from the data register units 512, 514 and 516 need not be outputted to the first, third and fourth data storage units 530, 550 and 560.

In the third step T2 (630 through 640), the data transmission controller 570 changes a level of the third control signal C3 into a logic high (e.g., bit '1') and changes levels of the first, second and fourth control signals C1, C2 and C4 into a logic low (e.g., bit '0') to turn on the switches 585 through 586.

The data transmission controller 570 controls the data transmission sections such that the data transmission controller 570 outputs, to the third data storage unit 550, the RGB signal outputted from the data register units 512, 514 and 516. The RGB signal outputted from the data register units 512, 514 and 516 need not be outputted to the first, second and fourth data storage units 530, 540 and 560.

In the fourth step T3 (640 through 650), the data transmission controller 570 changes levels of the third and fourth control signals C3 and C4 into a logic high (e.g., bit '1') and changes levels of the first and second control signals C1 and C2 into a logic low (e.g., bit '0') to turn on the switches 585 through 586 and 589 through 592.

The data transmission controller 570 controls the data transmission sections such that the data transmission controller 570 outputs, to the fourth data storage unit 560, the RGB signal outputted from the data register units 512, 514 and 516. The RGB signal outputted from the data register units 512, 514 and 516 need not be outputted to the first and second data units 530 and 540.

In the first through fourth steps T0 through T3, the number of the data latch units included in the respective data storage units corresponds to N and the number of the data latch circuits included in the respective data latch units corresponds to M.

The data transmission controller 570 performs a counting operation on the shift clock signal received from the shift register clock providing unit 580 and determines outputs of the control signals C1, C2, C3 and C4 based on a control value. The control value is obtained by firstly dividing the number of the counted shift clocks into a value of M×N, and by secondly dividing the divided number of the counted shift clocks into a value of M. When the control value corresponds to a value of 0, the data transmission controller 570 follows the first step T0 by controlling the control signals C1, C2, C3 and C4.

For example, if the number of the data latch units 534, 544, 554 and 564 included in the respective data storage units 530, 540, 550 and 560 corresponds to a value of 4, the number of the data latch circuits corresponds to a value of 120, and the number of the counted shift clocks corresponds to a value of 500, then the control value corresponds to a value of 0. Therefore, the data transmission controller 570 follows the first step T0 by controlling the control signals C1, C2, C3 and C4. The data transmission controller 570 outputs the RGB signal to the data storage unit 530.

Figure 7:
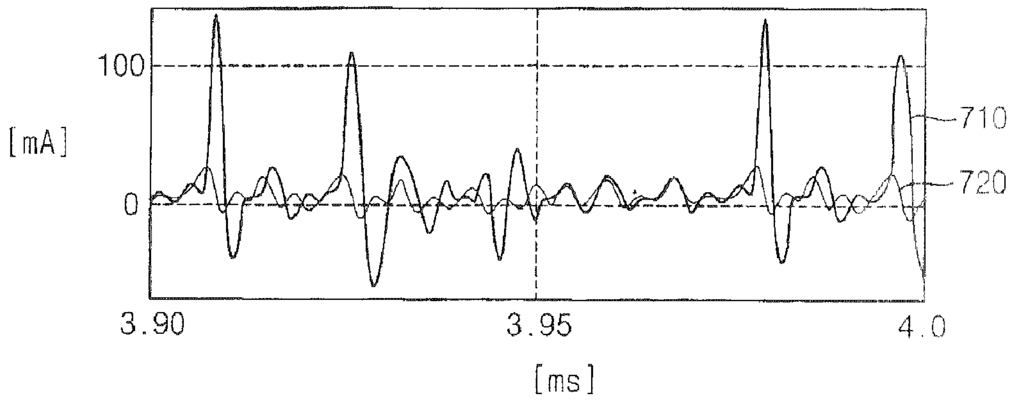
FIG. 7 is a graph illustrating a current change in an LCD device according to an exemplary embodiment of the present invention.
Figure 8:
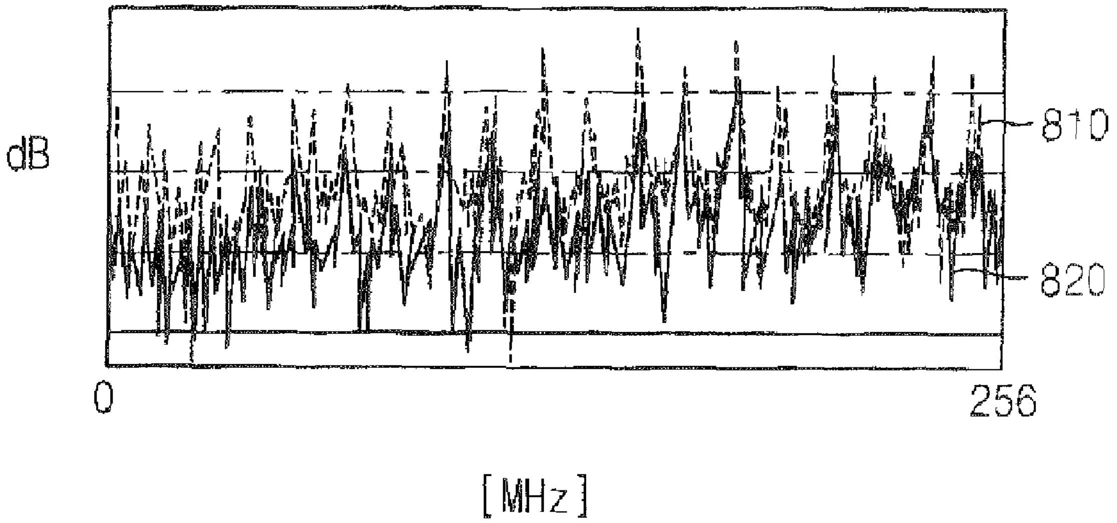
FIG. 8 is a graph illustrating a fast Fourier transform (EFT) value that is obtained by performing an FFT operation on the waves in FIG. 7.

FIG. 7 is a graph illustrating a current change in an LCD device according to an exemplary embodiment of the present invention, and FIG. 8 is a graph illustrating a fast Fourier transform (FFT) value that is obtained by performing an FFT operation on the waves in FIG. 7.

Referring to FIG. 7, a first curve 710 illustrates a current change in the conventional LCD device and a second curve 720 illustrates a current change in the LCD device according to an exemplary embodiment of the present invention.

A peak-to-peak value of the conventional LCD device corresponds to a value of about 150 and a peak-to-peak value of the LCD device according to an exemplary embodiment of the present invention corresponds to a value of about 30 or about 40. As shown in the above result, the peak-to-peak value of the LCD device according to an exemplary embodiment of the present invention may be reduced by more than 50% when the peak-to-peak value of the LCD device according to an exemplary embodiment of the present invention is compared with that of the conventional LCD device.

Also, an amount of the current flowing in the power providing unit 350 may be reduced by more than 10% in comparison with that in the conventional LCD device.

Referring to FIG. 8, a third curve 810 illustrates an FFT operation result in the conventional LCD device and a fourth curve 820 illustrates an FFT operation result in the LCD device according to an exemplary embodiment of the present invention.

EMI in the LCD device according to an exemplary embodiment of the present invention may be reduced by more than 10 dB when the EMI in the LCD device is compared with that of the conventional LCD device.

As described above, the LCD device according to exemplary embodiments of the present invention may reduce a power consumed in a source driver by controlling data transmission sections between a data register and a data latch unit.

Also, the LCD device according to exemplary embodiments of the present invention may reduce EMI that is proportional to the current in the source driver.

While the exemplary embodiments of the present invention and their advantages have been described in detail, it should be understood that various changes, substitutions and alterations may be made herein without departing from the scope of the invention.

What is claimed is:

1. A data transmission device comprising:

a data transmission line having a plurality of data transmission sections;

a data source configured to provide data to the data transmission line;

a plurality of data storage units, respectively coupled to the data transmission sections, the data storage units configured to determine whether the data storage units store the provided data from the plurality of data transmission sections and to sequentially store the provided data from the plurality of data transmission sections, based on the determined result, into the data storage units, from one end of the data storage units to another end of the data storage units; and a data transmission controller configured to control the data transmission sections such that at least one first data transmission section, of the plurality of data transmission sections, is turned on and at least one second data transmission section, of the plurality of data transmission sections, is turned off, wherein each of the at least one first data transmission sections is coupled between the data source and a first data storage unit, of the plurality of data storage units, that is determined to store the provided data, and wherein each of the at least one second data transmission section corresponds to a data transmission section, of the plurality of data transmission sections, that is other than the at least one first data transmission section.

2. The data transmission device of claim 1, further comprising:

a switching unit configured to turn on or off the data transmission lines, wherein the data transmission controller controls the switching unit to store the provided data into the one of the data storage units.

3. The data transmission device of claim 2, wherein the data transmission controller controls the switching unit to transmit the provided data to a first data transmission section between the data source and the one of the data storage units, wherein a second data transmission section corresponds to a data transmission section other than the first data transmission section.

4. The data transmission device of claim 1, further comprising:

a clock provider configured to provide a clock signal to the data storage units, wherein the data storage units respectively determine, based on the provided clock signal, whether the data storage units store the provided data.

5. The data transmission device of claim 4, wherein the data storage units respectively perform a counting operation on the provided clock signal and respectively determine, based on the counted clocks, whether the data storage units store the provided data.

6. A source driver in a liquid crystal display (LCD) device, comprising:

a data transmission line having a plurality of data transmission sections;

a data register configured to provide data to the data transmission line;

a plurality of data latch units, respectively coupled to the data transmission sections, the data latch units configured to determine whether the data latch units store the provided data from the plurality of data transmission sections and to sequentially store the provided data from the plurality of data transmission sections, based on the determined result, into the data latch units;

a shift register unit configured to transmit a control signal to the data latch units, respectively, so as to sequentially store the provided data into the plurality of data latch units, from one end of the data latch units to another end of the data latch units, the control signal indicating whether the data latch units respectively store the provided data; and a data transmission controller configured to control the data transmission sections such that at least one first data transmission section, of the plurality of data transmission sections, is turned on and at least one second data transmission section, of the plurality of data transmission sections, is turned off, wherein each of the at least one first data transmission sections is coupled between the data source and a first data latch unit, of the plurality of data latch units, that is determined to store the provided data, and wherein each of the at least one second data transmission section corresponds to a data transmission section, of the plurality of data transmission sections, that is other than the at least one first data transmission section.

7. The source driver of claim 6, wherein the shift register unit receives a clock signal from an external source, performs a shift operation on the received clock signal, and generates the control signal based on the shifted clock signal.

8. The source driver of claim 7, further comprising;

a clock provider configured to provide the clock signal to the shift register.

9. The source driver of claim 7, further comprising:

a switching unit configured to turn on or off the data transmission lines, wherein the data transmission controller controls the switching unit to store the provided data into the one of the data latch units.

10. The source driver of claim 9, wherein the data transmission controller controls the switching unit to transmit the provided data to a first data transmission section between a data source and the one of the data latch units, wherein a second data transmission section corresponds to a data transmission section other than the first data transmission section.

11. The source driver of claim 10, wherein the data transmission controller performs a counting operation on the provided clock signal and determines the first data transmission section based on the counted clocks.

12. The source driver of claim 11, wherein there are N data latch units, the data latch units respectively include M data latch circuits, and the data transmission controller determines the first data transmission section based on a control value, the control value being obtained by dividing the number of the counted clocks into a value of M.times.N, and by dividing the divided number of the counted shift clocks into a value of M, wherein N and M are positive integers.

13. An LCD device for reducing power consumption, comprising:

a display panel configured to include a plurality of gate lines and a plurality of data lines;

a gate driver configured to drive the gate lines in the display panel; and a source driver configured to drive the data lines in the display panel, the source driver comprising:

a data transmission line having a plurality of data transmission sections;

a data register configured to provide data to the data transmission line;

a plurality of data latch units respectively coupled to the data transmission sections, the data latch units configured to determine whether the data latch units store the provided data from the plurality of data transmission sections and to sequentially store the provided data from the plurality of data transmission sections, based on the determined result, into the data latch units, from one end of the data latch units to another end of the data latch units;

a shift register unit configured to transmit a control signal to the data latch units, respectively, and to sequentially store the provided data into the plurality of data latch units, from one end of the data latch units to another end of the data latch units, the control signal indicating whether the data latch units respectively store the provided data; and a data transmission controller configured to control the data transmission sections such that at least one first data transmission section, of the plurality of data transmission sections, is turned on and at least one second data transmission section, of the plurality of data transmission sections, is turned off, wherein each of the at least one first data transmission sections is coupled between the data source and a first data latch unit, of the plurality of data latch units, that is determined to store the provided data, and wherein each of the at least one second data transmission section corresponds to a data transmission section, of the plurality of data transmission sections, that is other than the at least one first data transmission section.

14. The LCD device of claim 13, wherein the shift register unit receives a clock signal from an external source, performs a shift operation on the received clock signal, and generates the control signal based on the shifted clock signal.

15. The LCD device of claim 14, further comprising;

a clock provider configured to provide the clock signal to the shift register unit.

16. The LCD device of claim 14, further comprising:

a switching unit configured to turn on or off the data transmission lines, wherein the data transmission controller controls the switching unit to store the provided data into the one of the data latch units.

17. The LCD device of claim 16, wherein the data transmission controller controls the switching unit to transmit the provided data to a first data transmission section between the data source and the one of the data latch units, wherein a second data transmission section corresponds to a data transmission section other than the first data transmission section.

18. The LCD device of claim 17, wherein the data transmission controller performs a counting operation on the provided clock signal and determines the first data transmission section based on the counted clocks.

19. The LCD device of claim 18, wherein there are N data latch units, the data latch units respectively include M data latch circuits, and the data transmission controller determines the first data transmission section based on a control value, the control value being obtained by dividing the number of the counted clocks into a value of $M \times N$, and dividing the divided number of the counted shift clocks into a value of M, wherein N and M are positive integers.

20. A method of transmitting data, comprising:

receiving data from a data source;

transmitting the received data from the data source to a plurality of data storage units respectively coupled to a data transmission line, the data transmission line including a plurality of data transmission sections;

determining whether the data storage units respectively store the received data from the plurality of data transmission sections and to sequentially store the received data from the plurality of data transmission sections, into the data storage units, from one end of the data storage units to another end of the data storage units; and controlling the data transmission sections such that at least one first data transmission section, of the plurality of data transmission sections, is turned on and at least one second data transmission section, of the plurality of data transmission sections, is turned off, wherein each of the at least one first data transmission sections is coupled between the data source and a first data storage unit, of the plurality of data storage units, that is determined to store the provided data, and wherein each of the at least one second data transmission section corresponds to a data transmission section, of the plurality of data transmission sections, that is other than the at least one first data transmission section, wherein the above steps are performed within an LCD device.

21. The method of claim 20, wherein determining whether the data storage units respectively store the received data comprises:

performing a shift operation on a clock signal received from an external source; and determining, based on the shifted clock signal, whether the data storage units store the received data.

22. The method of claim 20, wherein controlling the data transmission sections comprises controlling a switch unit configured to turn on or off the data transmission sections.

23. A method of driving a source driver in an LCD device, comprising:

receiving data from a data register;

transmitting the received data from the data register to a plurality of data latch units, respectively coupled to a data transmission line, the data transmission line including a plurality of data transmission sections;

determining whether the data latch units respectively store the received data from the plurality of data transmission sections and to sequentially store the received data from the plurality of data transmission sections, into the data storage units, from one end of the data latch units to another end of the data latch units; and controlling the data transmission sections such that at least one first data transmission section, of the plurality of data transmission sections, is turned on and at least one second data transmission section, of the plurality of data transmission sections, is turned off, wherein each of the at least one first data transmission sections is coupled between the data source and a first data storage unit, of the plurality of data storage units, that is determined to store the provided data, and wherein each of the at least one second data transmission section corresponds to a data transmission section, of the plurality of data transmission sections, that is other than the at least one first data transmission section, wherein the above steps are performed within an LCD device.

24. The method of claim 23, wherein determining whether the data latch units respectively store the received data comprises:

performing a shift operation on a clock signal received from an external source; and determining, based on the shifted clock signal, whether the data latch units store the received data.

25. The method of claim 24, wherein controlling the data transmission sections comprises controlling a switch unit configured to turn on or off the data transmission sections.

26. The method of claim 25, wherein controlling the switch unit comprises:

performing a count operation on the received clock signal; and determining, based on the count operation, a data transmission section between the data register and the one of the data latch units.

* * * * *